United States Patent [19]

Dalferth

[11] Patent Number: 4,850,942
[45] Date of Patent: Jul. 25, 1989

[54] CHAIN WHEEL WITH POCKETS

[75] Inventor: Hans Dalferth, Aalen-Wasseralfingen, Fed. Rep. of Germany

[73] Assignee: Rud-Kettenfabrik Rieger & Dietz GmbH u.Co., Aalen, Fed. Rep. of Germany

[21] Appl. No.: 121,920

[22] Filed: Nov. 18, 1987

[30] Foreign Application Priority Data

Nov. 21, 1986 [DE] Fed. Rep. of Germany ....... 3639784

[51] Int. Cl.⁴ ............................................. F16H 7/06
[52] U.S. Cl. ................................................... 474/155
[58] Field of Search ............................. 474/155–157, 474/206, 162; 59/84, 85

[56] References Cited

U.S. PATENT DOCUMENTS

| 4,343,614 | 8/1982 | Schulte | 474/155 |
| 4,473,364 | 9/1984 | Roling | 474/164 |

FOREIGN PATENT DOCUMENTS

| 694515 | 8/1940 | Fed. Rep. of Germany . |
| 1292986 | 4/1969 | Fed. Rep. of Germany . |
| 3115927 | 4/1981 | Fed. Rep. of Germany . |
| 0015125 | 10/1983 | Fed. Rep. of Germany . |

Primary Examiner—Thuy M. Bui
Attorney, Agent, or Firm—Mark P. Stone

[57] ABSTRACT

In a chain wheel with pockets (3) for locating horizontal links (4) of a round steel chain, teeth (2) are used, adjoining the rounded tooth-root sections (6) of which are inclined surfaces (7) which serve to support horizontal links (4) of chains, the picth of which is larger than the pitch of the chain wheel. A conventional support of the horizontal links on flat bottoms (8) of the pockets (3) is deliberately omitted.

12 Claims, 5 Drawing Sheets

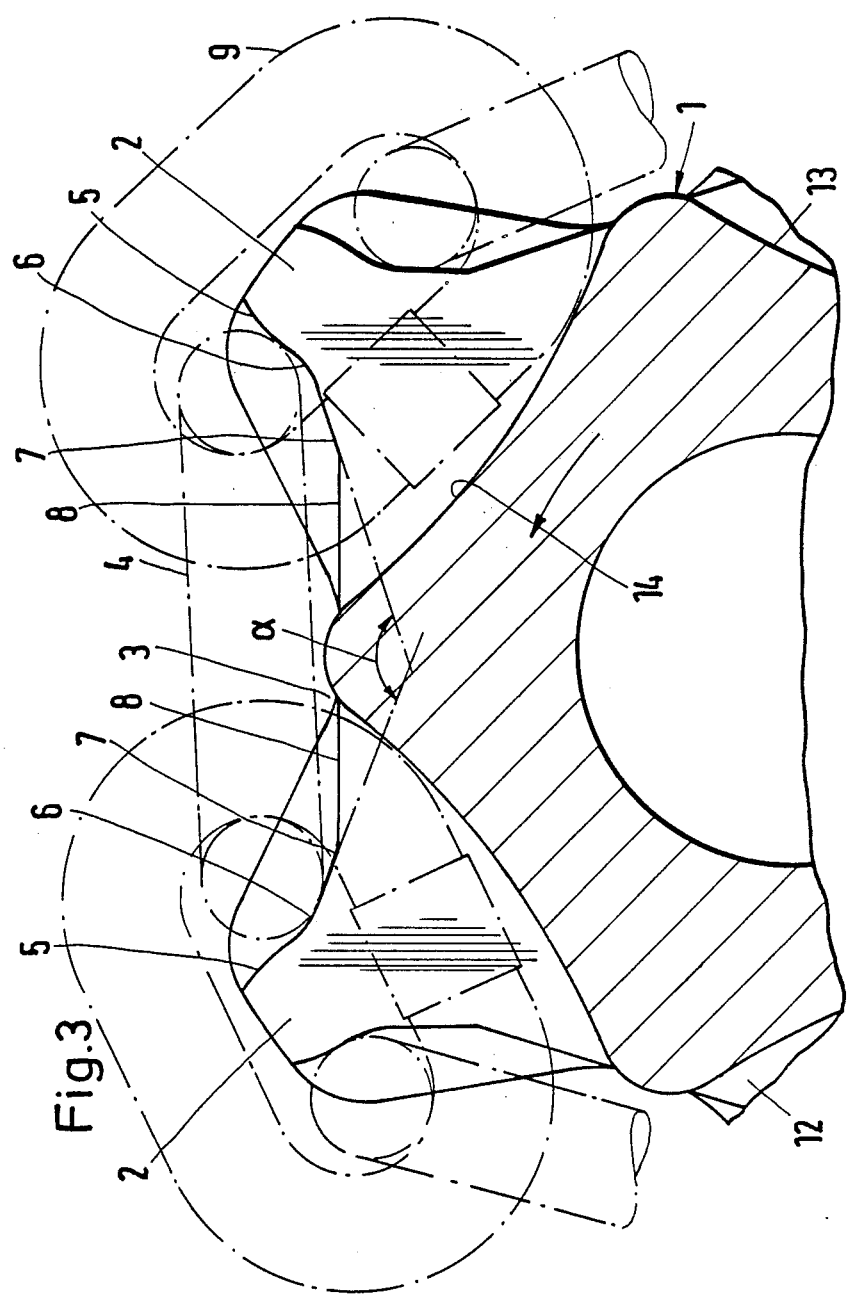

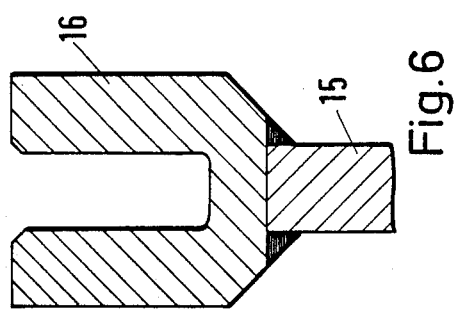
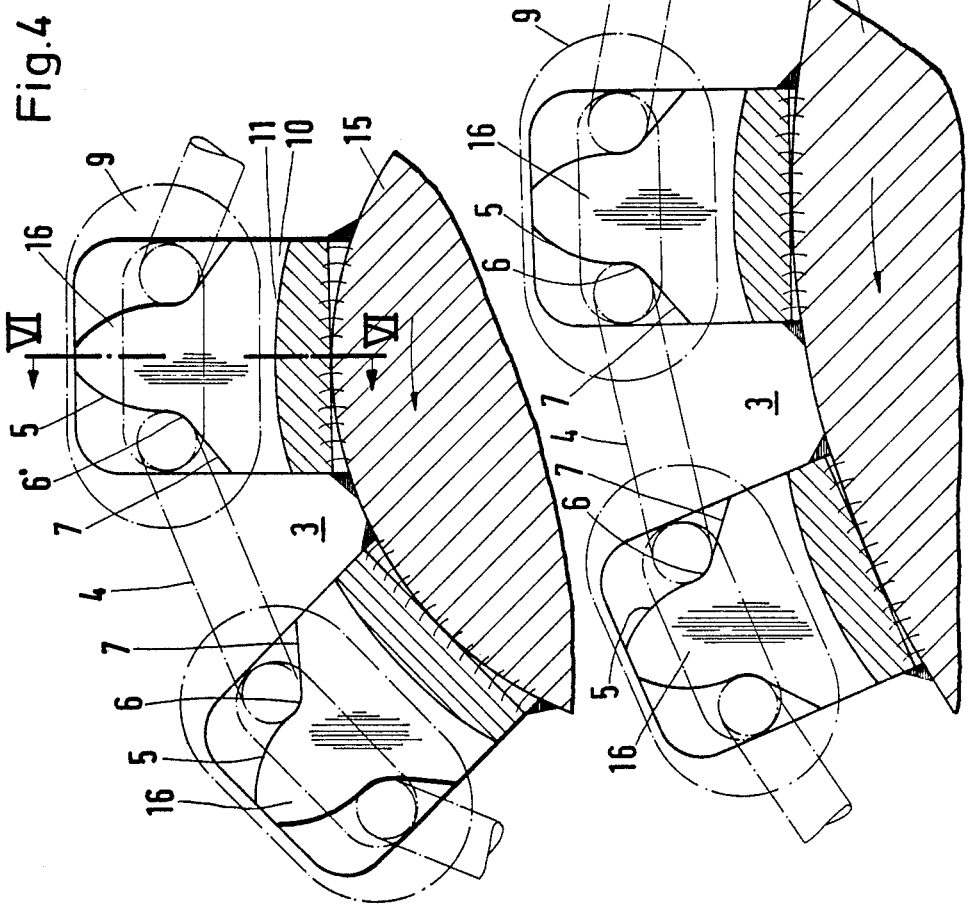

CHAIN WHEEL WITH POCKETS

BACKGROUND OF THE INVENTION

The invention relates to a chain wheel having pockets which serve to locate the horizontal links of a round steel chain, which only partly support the horizontal links and are each formed by four teeth, the flanks of which have a convex head part and a concave root part which adjoins the head part and has a rounded tooth-root section, the radius of curvature of which is essentially equal to half the thickness of the chain links, and also having an encircling groove which serves to locate the vertical links and subdivides the pockets in each case into two halves.

In known chain wheels of the abovementioned type, the rounded sections of the tooth roots which are also designated as tooth-root radii and are adapted to the contour of the chain links merge directly into the pocket bottom which forms an essentially flat bearing surface, provided with a recess in the area of the link sides, at least for the toric parts of the horizontal links (DIN draft 00 15 125, German Offenlegungsschrift No. 3,115,927). In other words, the bearing surfaces in the known chain wheels form tangential planes to an imaginary cylinder, the longitudinal axis of which coincides with the axis of rotation of the chain wheel.

Tests have shown that the known type of support is not without its problems. This is because, as a result of frictional wear caused by relative movements between the chain wheel and the incoming horizontal links, wear hollows form in the area of the pocket bottoms which adjoins the rounded tooth-root sections. Although these wear hollows do not constitute a serious risk to the chain wheels, they do constitute a serious risk to the horizontal links. The reason for this can be seen from the fact that the vertical links attempt to press the horizontal link parts located in the area of the wear hollows into the wear hollows. At the same time, the edge of the wear hollows which faces the center of the pocket bottom forms a type of tilting edge which leads to bending stresses in the horizontal links which can cause fractures in particular at higher loads.

SUMMARY OF THE INVENTION

The object of the invention, while utilizing the above knowledge, is to create a chain wheel which makes better guidance of the horizontal links possible, i.e. guidance which reduces the risk of fracture. This object is achieved according to the invention when, in a chain wheel of the generic type, inclined surfaces which slope down toward the inside of the wheel and mutually enclose an angle adjoin the lower ends of the rounded tooth-root sections of the teeth of each chain pocket which follow one another in the peripheral direction of the chain wheel.

The chain wheel according to the invention offers the advantage that the horizontal links guided by it are not exposed to any bending loads of the type described at the beginning. The provision of inclined surfaces and the deliberate omission connected herewith of the support of the horizontal links by flat parts of the pocket bottom, which support is generally considered to be necessary, is not connected with negative consequences. On the contrary, it opens up the possibility of an especially economical production of the chain wheels in which their teeth forming the chain pockets are connected to the basic body of the chain wheel by welding. This is because the inclined surfaces enable identical teeth to be used for chain wheels of different pitch and in this way also enable the stock-keeping costs to be reduced. Irrespective of the type of manufacture of chain wheels according to the invention, these chain wheels prove to be less sensitive to wear compared with conventional chain wheels.

BRIEF DESCRIPTION OF THE DRAWINGS

Further details and features of the invention follow from the subclaims and the description below of several advantageous exemplary embodiments shown in the attached drawing, in which:

FIG. 3 shows a section corresponding to FIG. 2, with an enlarged chain pitch compared with the chain wheel pitch, FIG. 4 shows section through a part of a third chain wheel with smaller pitch and welded-on teeth, FIG. 5 shows section through a part of a chain wheel with larger pitch and likewise welded-on teeth, FIG. 6 shows a section along line VI—VI in FIG. 4.

DISCUSSION OF THE BEST MODES FOR CARRYING OUT THE INVENTION

Figure 1:
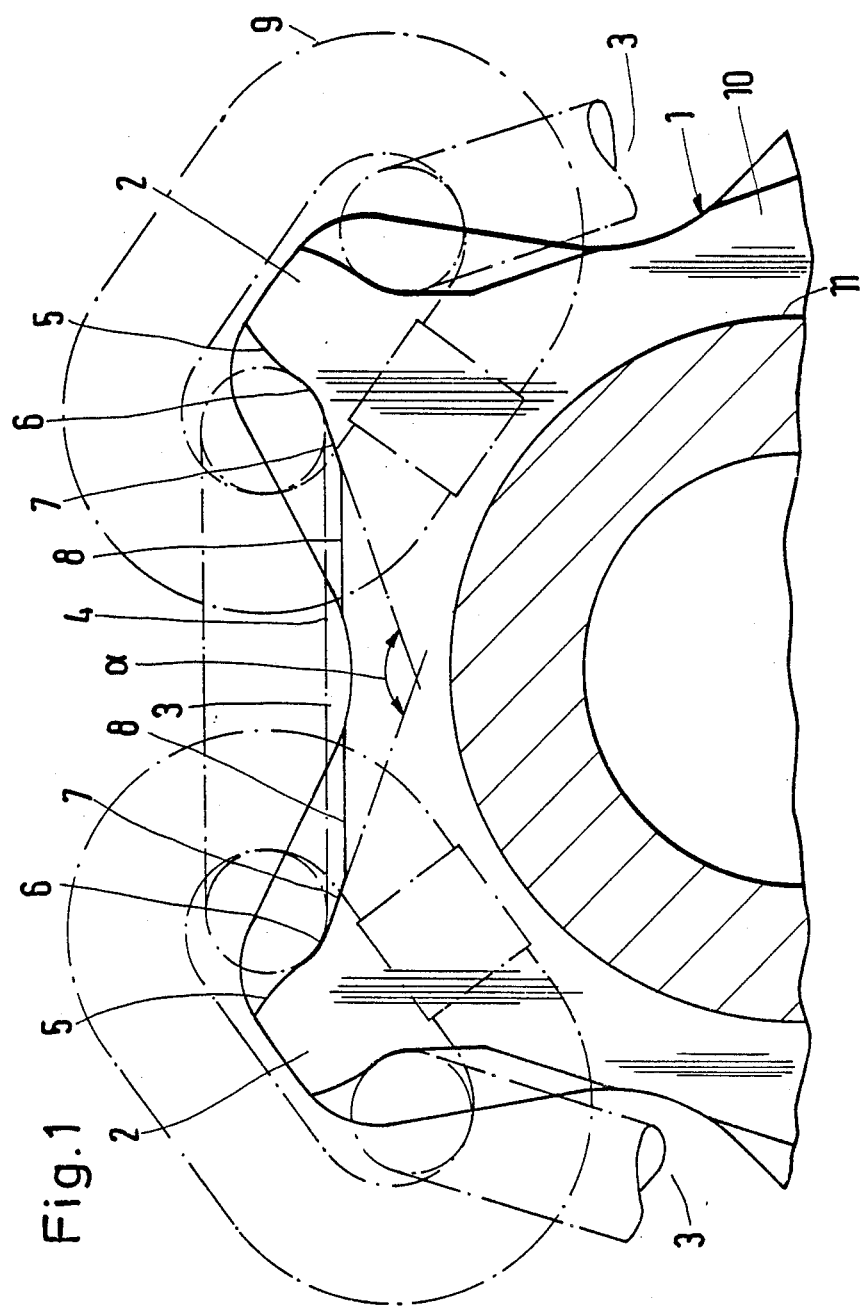
FIG. 1 shows a section through a part of a first chain wheel, with an identical pitch of chain wheel and chain.

In FIG. 1, 1 is the basic body of a chain wheel, over the periphery of which several pockets, defined by teeth 2, for horizontal links 4 are distributed. The tooth flanks 5 of the teeth 2 are of convex configuration in the area of their head part and of concave configuration in the area of their root part, and they have rounded tooth-root sections 6, the radius $r_1$ of curvature of which is essentially equal to half the nominal thickness d of the horizontal links 4. Adjoining the rounded tooth-root sections 6 are inclined surfaces 7 which merge into the respective pocket bottom 8. At least the parts of the inclined surfaces 7 of successive teeth 2 of a pocket which adjoin the rounded tooth-root sections 6 mutually enclose an angle $\alpha$. In the drawing, only the rear teeth 2 of a pocket 3 are shown, since the section is taken through the center of the groove 10 which serves to locate the vertical links 9 and the base of which is circular in the case of FIG. 1. Each pocket 3 is formed from four teeth 2, one pair of teeth 2 being located to one side of the groove 10 while the other pair of teeth 2 being located on the opposed side of groove 10.

Figure 2:
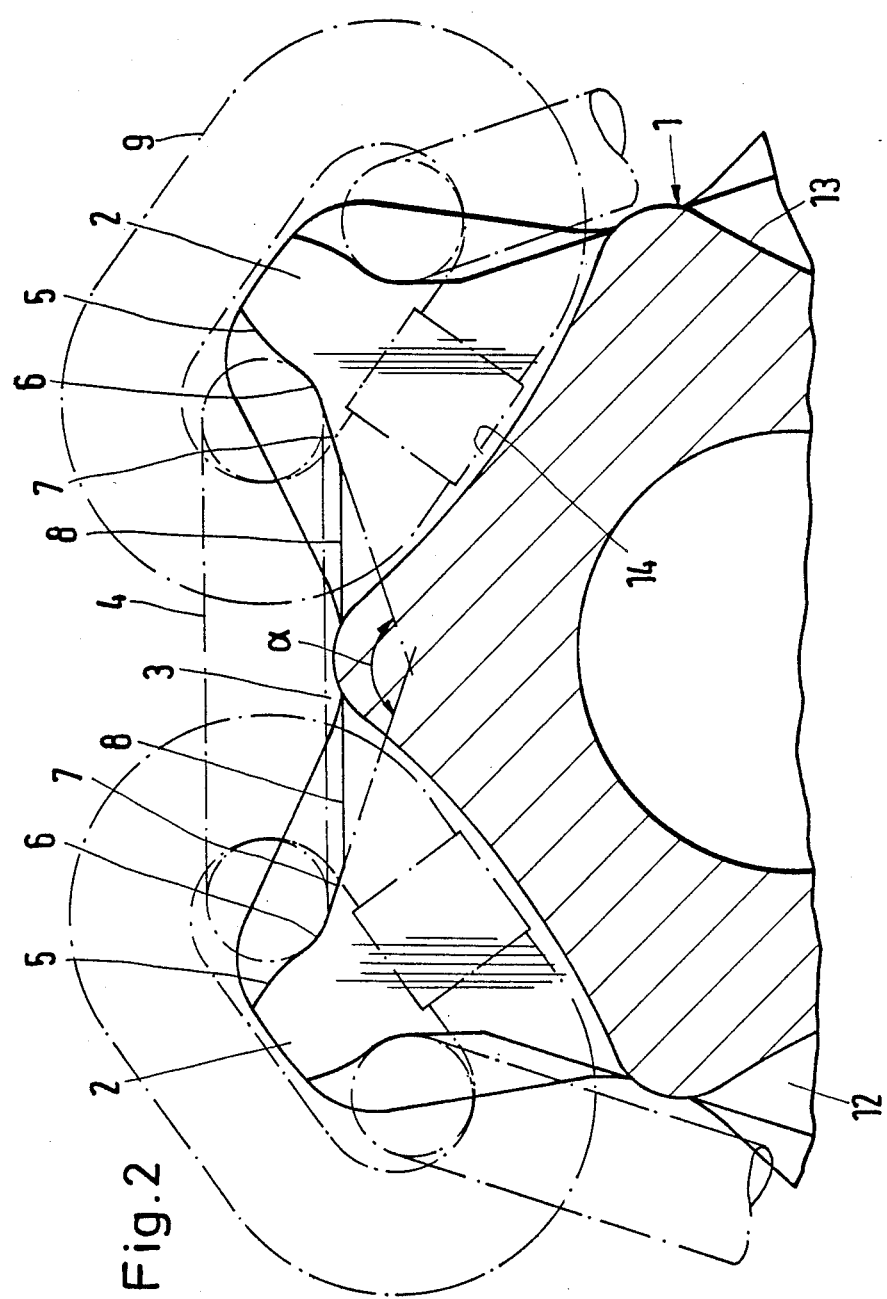
FIG. 2 shows a section through a part of a second chain wheel, likewise with an identical pitch of chain wheel and chain.

FIG. 2 shows a chain wheel which largely corresponds to the chain wheel according to FIG. 1. However, a difference from the design described first is that a groove 12 is used which has a base 13, the periphery of which, in the area of the teeth 2, as described further below forms supporting hollows 14 for vertical links 9 which are tilted, for example, as a result of an increase in pitch caused by wear.

FIG. 1, like FIG. 2, shows a nominal position of the horizontal links which in practice is hardly ever achieved in particular on account of production tolerances and/or wear phenomena. In this nominal position, the noses of the horizontal links are supported on the rounded tooth-root sections 6, i.e. regular contact does not take place either between the pocket bottom and the horizontal link 4 or between the base 11 or 13 of the grooves 10 or 12 respectively and the vertical link 9.

In contrast, FIG. 3 shows the relationships as they occur in practice, in a representation somewhat exaggerated for better understanding. On account of the larger pitch of the chain compared with the tooth pitch of the chain wheel, the rear nose of the horizontal link 4 driven by the right-hand tooth 2, while passing the chain wheel, wanders upward along the tooth flank 5, whereas the front nose slips slightly downward on the left-hand inclined surface 7. On account of the slope of the inclined surface 7, against which the front nose of the horizontal link 4 is supported, and on account of the frictional and force relationships at the supporting points, the slipping movement starts at a later moment than in conventional chain wheels. This means that the forces which occur between the slipping link and the chain wheel are lower in the slipping phase and result in a reduction in wear. The service life of both the chain wheel and the chain is increased in this manner.

In the case of the chain wheel according to FIGS. 2 and 3, a further relief of the load on the horizontal link 4 used for transmitting the peripheral force is achieved owing to the fact that contact occurs between the vertical link 9 and the supporting hollow 14 formed by the groove base 13. This, too, has a positive effect on the service life of the chain wheel and the chain.

FIGS. 4 to 6 show two chain wheels with teeth welded on a basic body 15. The same teeth 16 are used in both chain wheels. This is possible on account of the inclined surfaces 7 despite different tooth pitches.

Figure 8:
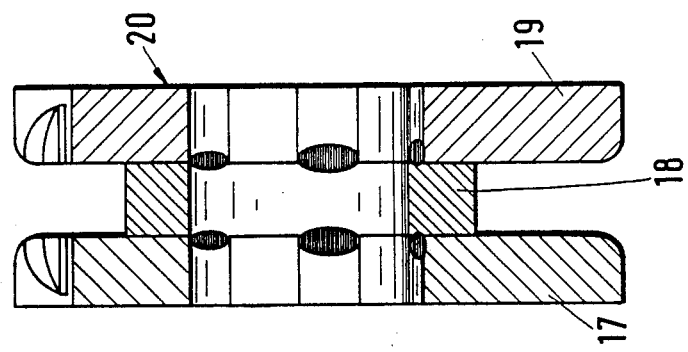
FIG. 8 shows a section along line VIII—VIII in FIG. 7.
Figure 7:
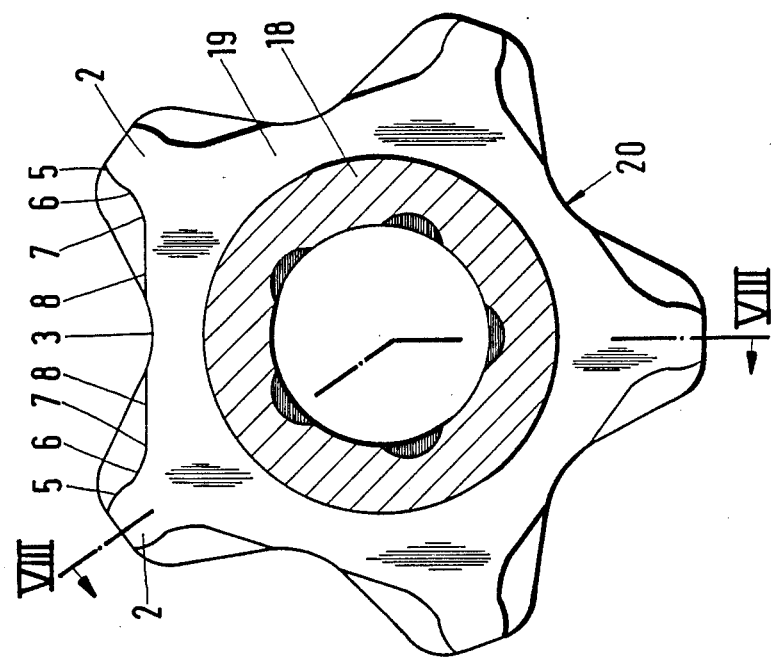
FIG. 7 shows a section through a further chain wheel.

Whereas the basic body 15 of the chain wheel according to FIGS. 4 to 6 is made in one piece, the chain wheel according to FIGS. 7 and 8 has a basic body 20 formed from three rings 17, 18, 19 connected together by welding. In this case, the teeth 2 are milled into the rings 17 and 19.

I claim:

1. Chain wheel having pockets which serve to locate horizontal links of a round steel chain comprising horizontal and vertical links and only partly support the horizontal links, each of said pockets being formed by four teeth each having flanks, the flanks of said teeth having a convex head part and a concave root part which adjoins the head part and has a rounded tooth-root section, the radius of curvature of said rounded tooth-root section being essentially equal to half the thickness of the chain links, said chain wheel also having an encircling groove which serves to locate the vertical links of said round steel chain and subdivides the pockets in each case into two halves in which a pair of said teeth are each located on opposed sides of said encircling groove, said inclined surfaces (7) which slope down toward the inside of the wheel and mutually enclose an angle (a) adjoin the lower ends of the rounded tooth-root sections (6) of the teeth (2; 16) of each chain pocket (3) which follow one another in the peripheral direction of the chain wheel.

2. The chain wheel as claimed in claim 1, wherein the inclined surfaces (7) keep the horizontal links (4) at a distance from the bottoms (8) of the pockets (3).

3. The chain wheel as claimed in claim 1 or 2, wherein the inclined surfaces (7) of a chain pocket (3) which follow one another in each case mutually enclose an angle ($\alpha$) of 120° to 150°.

4. The chain wheel as claimed in claim 1, wherein the base (13) of the encircling groove (12) is provided with supporting hollows (14) for supporting the vertical links (9).

5. The chain wheel as claimed in claim 1, wherein the teeth (16) are welded to a basic body (15) of the chain wheel.

6. The chain wheel as claimed in claim 1, wherein two rings (17, 19), having the teeth (2) of the chain wheel, and a ring (18) arranged between the rings (17, 19) and forming the encircling groove are welded together.

7. The chain wheel as claimed in claim 1, wherein the inclined surfaces (7) are straight.

8. The chain wheel as claimed in claim 2, wherein the inclined surfaces (7) of a chain pocket (3) which follow one another in each case mutually enclose an angle (a) of 120° to 150°.

9. The chain wheel as claimed in claim 2, wherein the base (13) of the encircling groove (12) is provided with supporting hollows (14) for supporting the vertical links (9).

10. The chain wheel as claimed in claim 2, wherein the teeth (16) are welded to a basic body (15) of the chain wheel.

11. The chain wheel as claimed in claim 2, wherein two rings (17, 19), having the teeth (2) of the chain wheel, and a ring (18) arranged between the rings (17, 19) and forming the encircling groove are welded together.

12. The chain wheel as claimed in claim 2, wherein the inclined surfaces (7) are straight.

* * * * *